(12) United States Patent
Lucas et al.

(10) Patent No.: US 9,062,679 B2
(45) Date of Patent: Jun. 23, 2015

(54) DOUBLE THROAT PULSATION DAMPENER FOR A COMPRESSOR

(75) Inventors: Michael John Lucas, Mooresville, NC (US); James David Gillon, Kannapolis, NC (US); Jason William Hunt, Charlotte, NC (US)

(73) Assignee: Ingersoll-Rand Company, Davidson, NC (US)

( * ) Notice: Subject to any disclaimer, the term of this patent is extended or adjusted under 35 U.S.C. 154(b) by 1118 days.

(21) Appl. No.: 12/463,457

(22) Filed: May 11, 2009

(65) Prior Publication Data

US 2009/0218164 A1    Sep. 3, 2009

Related U.S. Application Data

(63) Continuation of application No. 11/111,269, filed on Apr. 21, 2005, now Pat. No. 7,549,509.

(51) Int. Cl.
  *F04B 53/00*  (2006.01)
  *F04C 29/06*  (2006.01)
  *F04B 39/00*  (2006.01)
  *F16L 55/04*  (2006.01)

(52) U.S. Cl.
  CPC .......... *F04C 29/061* (2013.01); *F04B 39/0055* (2013.01); *F16L 55/041* (2013.01)

(58) Field of Classification Search
  USPC .......... 417/312, 902; 181/212, 229, 230, 247, 181/249, 403
  See application file for complete search history.

(56) References Cited

U.S. PATENT DOCUMENTS

| | | | |
|---|---|---|---|
| 1,611,475 A * | 12/1926 | Maxim | 181/249 |
| 1,811,762 A | 6/1931 | Schnell | |
| 2,046,193 A | 6/1936 | Spicer | |
| 2,073,951 A | 3/1937 | Servais | |
| 2,748,753 A | 6/1956 | Sarrazin et al. | |
| 2,950,775 A | 8/1960 | Zwayer | |
| 2,966,138 A | 12/1960 | Quackenbush | |
| 3,028,551 A | 9/1965 | Carls | |

(Continued)

FOREIGN PATENT DOCUMENTS

| | | |
|---|---|---|
| EP | 0 774 581 | 1/2001 |
| FR | 841390 | 5/1939 |

OTHER PUBLICATIONS

Communication from the European Patent Office with European Search Report dated Jul. 8, 2004 for European Patent Application No. 04251248.3 (4 pages).

*Primary Examiner* — Devon Kramer
*Assistant Examiner* — Patrick Hamo
(74) *Attorney, Agent, or Firm* — Krieg Devault LLP

(57) ABSTRACT

A method of attenuating fluid dynamic pulsations that propagate through a flow of fluid at a convective velocity of the fluid, the pulsations having an organized vortical structure includes directing the flow to a pulsation dampener inlet having a first area and transitioning the organized vortical structure to a small-scale turbulent structure by squeezing the vorticies by passing the flow of fluid through a passage having a second area that is smaller than the first area, then rapidly expanding the flow of fluid by passing it into a chamber having a third area measured at an inlet of the chamber that is substantially larger than the second area. The method also includes discharging the flow of fluid from the chamber. The flow of fluid includes substantially attenuated fluid dynamic pulsations and acoustic pulsations that travel through the flow of fluid at the speed of sound.

13 Claims, 6 Drawing Sheets

(56) References Cited

U.S. PATENT DOCUMENTS

| | | |
|---|---|---|
| 3,299,781 A | 1/1967 | Law |
| 3,384,200 A | 5/1968 | Baker et al. |
| 3,526,293 A | 9/1970 | Hayes et al. |
| 3,563,213 A | 2/1971 | Hambric |
| 3,608,666 A | 9/1971 | Olsson |
| 3,628,627 A | 12/1971 | Arnold |
| 3,823,795 A | 7/1974 | Fleigle |
| 3,880,245 A | 4/1975 | Anderson, Jr. |
| 3,981,378 A | 9/1976 | Potter |
| 4,015,683 A | 4/1977 | Williams |
| 4,082,160 A | 4/1978 | Schilling et al. |
| 4,134,472 A | 1/1979 | Trainor |
| 4,184,564 A | 1/1980 | Trainor |
| 4,205,732 A | 6/1980 | Auerbach et al. |
| 4,258,798 A | 3/1981 | Campbell |
| 4,258,799 A | 3/1981 | Eckman |
| 4,628,528 A | 12/1986 | Bose et al. |
| 4,690,245 A * | 9/1987 | Gregorich et al. ............ 181/272 |
| 4,693,339 A | 9/1987 | Beale et al. |
| 4,778,015 A | 10/1988 | Jacobsson |
| 4,934,482 A | 6/1990 | Herron et al. |
| 4,936,413 A * | 6/1990 | Lee ............................... 181/264 |
| 5,123,501 A | 6/1992 | Rothman et al. |
| 5,133,647 A | 7/1992 | Herron et al. |
| 5,174,113 A | 12/1992 | Deville |
| 5,183,974 A | 2/1993 | Wilhelm et al. |
| 5,244,521 A | 9/1993 | Ligman |
| 5,418,339 A | 5/1995 | Bowen et al. |
| 5,495,078 A | 2/1996 | Stief |
| 5,559,310 A | 9/1996 | Hoover et al. |
| 5,588,903 A | 12/1996 | Pennison |
| 5,590,688 A | 1/1997 | Pitkanen et al. |
| 5,687,802 A | 11/1997 | Spooner et al. |
| 5,767,459 A | 6/1998 | Sell |
| 5,810,566 A | 9/1998 | Pauwels |
| 5,841,080 A | 11/1998 | Iida et al. |
| 5,847,334 A | 12/1998 | Taga |
| 5,905,233 A * | 5/1999 | Gobert .......................... 181/229 |
| 5,909,016 A | 6/1999 | Sterling |
| 5,952,623 A | 9/1999 | Sterling |
| 6,035,485 A | 3/2000 | Holsten |
| 6,062,323 A | 5/2000 | Pusateri et al. |
| 6,105,716 A * | 8/2000 | Morehead et al. ............ 181/255 |
| 6,109,387 A | 8/2000 | Boretti |
| 6,202,785 B1 | 3/2001 | Hilling et al. |
| 6,209,678 B1 | 4/2001 | Sterling |
| 6,278,789 B1 | 8/2001 | Potter |
| 6,338,389 B1 | 1/2002 | Chang |
| 6,347,609 B1 * | 2/2002 | Bloomer .................. 123/184.57 |
| 6,427,782 B2 | 8/2002 | Brady |
| 6,435,303 B1 | 8/2002 | Warnaka |
| 6,524,080 B1 * | 2/2003 | Chintamani et al. .......... 417/312 |
| 6,547,535 B2 | 4/2003 | Kueon |
| 6,648,098 B2 | 11/2003 | Nichols |
| 6,691,662 B2 | 2/2004 | Pontoppidan |
| 6,771,787 B1 | 8/2004 | Hoefler et al. |
| 2001/0013443 A1 | 8/2001 | Sterling |
| 2003/0183447 A1 | 10/2003 | Zindl et al. |
| 2006/0086563 A1 | 4/2006 | Lucas |

* cited by examiner

DOUBLE THROAT PULSATION DAMPENER FOR A COMPRESSOR

RELATED APPLICATION DATA

The present application is a continuation of U.S. patent application Ser. No. 11/111,269 filed Apr. 21, 2005, and entitled "Double Throat Pulsation Dampener for a Compressor," the entire contents of which are fully incorporated herein by reference.

BACKGROUND

The present invention relates to pulsation dampeners used on oil free screw compressors to suppress the pressure pulsations generated by the compressor airend. A pulsation dampener reduces the mechanical vibrations in the downstream piping system caused by the pressure pulsations originating from the outlet of the compressor. If these pulsations are left undamped, the pulsations can damage the piping system, coolers, moisture separator, valves and ancillary equipment. Pulsation dampeners reduce noise heard from the compressor by reducing the pressure pulsations inside the piping system.

The venturis 10 and 15 shown in FIGS. 1-2 and 3-4, respectively, are currently used to reduce pressure pulsations. A venturi is a high pass acoustical device. A high pass device attenuates pressure pulsations having low frequencies while allowing high frequency pressure pulsations to pass through the device. Oil free compressor applications require a low pass acoustical device. A low pass acoustical device attenuates the high frequencies and allows low frequencies to pass through the device. The venturi does offer some attenuation at the higher frequencies, but the attenuation is not sufficient (i.e., does not cover broad ranges of frequencies) to reduce all of the pulsations. Insufficient attenuating of the high frequency pressure pulsations by the venturi have resulted in high noise levels, damage to check valves, cooler failures and ringing piping systems.

SUMMARY

Some embodiments of the present invention provide a pulsation dampener for receiving a fluid medium comprising pressure pulsations. The pulsation dampener can include a body having an inlet end and an outlet end. The inlet end can include an inlet having a first cross-sectional area, and the outlet end can include an outlet. The pulsation dampener can further include a fluid path defined at least partially by the body and extending between the inlet and the outlet. The fluid path can include a first contracting chamber positioned adjacent the inlet and having a second cross-sectional area, a first expansion chamber positioned adjacent the first contracting chamber and having a third cross-sectional area, and a second contracting chamber positioned adjacent the first expansion chamber and having a fourth cross-sectional area. The fluid path can be configured such that the second cross-sectional area is less than the first cross-sectional area and the third cross-sectional area, and the fourth cross-sectional area is less than the third cross-sectional area.

In some embodiments of the present invention, a pulsation dampener for receiving a fluid medium comprising pressure pulsations is provided. The pulsation dampener can include a body having an inner surface, an inlet, and an outlet. The pulsation dampener can further include a fluid path defined at least partially by the inner surface of the body. The fluid path can include a first chamber in fluid communication with the inlet and having a first cross-sectional area, a second chamber positioned adjacent the first chamber and having a second cross-sectional area different from the first cross-sectional area, and a third chamber in fluid communication with the outlet and positioned adjacent the second chamber opposite the first chamber. The third chamber can include a third cross-sectional area different from the second cross-sectional area. The fluid path can be configured such that the second cross-sectional area is greater than the first cross-sectional area and the third cross-sectional area.

Some embodiments of the present invention provide a pulsation dampener for receiving a fluid medium comprising pressure pulsations. The pulsation dampener can include a body having an inner surface, an inlet end, and an outlet end. The inlet end can include an inlet having a first cross-sectional area, and the outlet end can include an outlet. The pulsation dampener can further include a fluid path defined at least partially by the inner surface of the body and extending between the inlet and the outlet. The fluid path can include a first contracting chamber positioned adjacent the inlet and having a second cross-sectional area, a first expansion chamber positioned adjacent the first contracting chamber opposite the inlet and having a third cross-sectional area, a second contracting chamber positioned adjacent the first expansion chamber opposite the first contracting chamber and having a fourth cross-sectional area, and a second expansion chamber positioned adjacent the second contracting chamber opposite the first expansion chamber and having a fifth cross-sectional area. The fluid path can be configured such that the second cross-sectional area is less than the first cross-sectional area and the third cross-sectional area, and the fourth cross-sectional area is less than the third cross-sectional area and the fifth cross-sectional area.

In one construction, the invention provides a method of attenuating fluid dynamic pulsations that propagate through a flow of fluid at a convective velocity of the fluid, the pulsations having an organized vortical structure. The method includes directing the flow to a pulsation dampener inlet having a first area and transitioning the organized vortical structure to a small-scale turbulent structure by squeezing the vorticies by passing the flow of fluid through a passage having a second area that is smaller than the first area, then rapidly expanding the flow of fluid by passing it into a chamber having a third area measured at an inlet of the chamber that is substantially larger than the second area. The method also includes discharging the flow of fluid from the chamber. The flow of fluid includes substantially attenuated fluid dynamic pulsations and acoustic pulsations that travel through the flow of fluid at the speed of sound.

In another construction, the invention provides a method of attenuating pulsations produced by the operation of a compressor. Operation of the compressor produces fluid dynamic pulsations that propagate through a flow of fluid at a convective velocity of the fluid and acoustic pulsations that propagate through the flow of fluid at the speed of sound. The method includes converting the fluid dynamic pulsations to acoustic pulsations by first constricting the flow of fluid and then rapidly expanding the flow of fluid and attenuating the acoustic pulsations by passing the flow of fluid through a converging diverging nozzle.

In yet another construction, the invention provides a method of attenuating pulsations in a flow of fluid produced by the operation of a compressor. The method includes directing the flow of fluid to a pulsation dampener inlet having a maximum diameter that defines a first cross sectional area, constricting the flow of fluid by passing it through a constricting flow path having a minimum diameter that defines a second cross sectional area that is smaller than the first cross sectional area, and suddenly expanding the flow of fluid by discharging the flow of fluid into a chamber having an inlet cross sectional area that is substantially larger than the second cross sectional area. The inlet cross sectional area being measured immediately adjacent the minimum diameter of the constricting flow path. The method also includes gradually constricting the flow of fluid by passing it through a chamber flow path in which the cross sectional area gradually reduces to a minimum third cross sectional area, gradually expanding the flow of fluid by passing it through an expanding flow path in which the cross sectional area gradually increases to a maximum fourth cross sectional area, and discharging the flow of fluid from the pulsation dampener via an opening having an outlet cross sectional area that is about equal to the fourth cross sectional area.

Other features and aspects of the invention will become apparent by consideration of the detailed description and accompanying drawings.

DETAILED DESCRIPTION

The present invention will be described with reference to the accompanying drawing figures wherein like numbers represent like elements throughout. Certain terminology, for example, "top", "bottom", "right", "left", "front", "frontward", "forward", "back", "rear" and "rearward", is used in the following description for relative descriptive clarity only and is not intended to be limiting.

Figure 5:
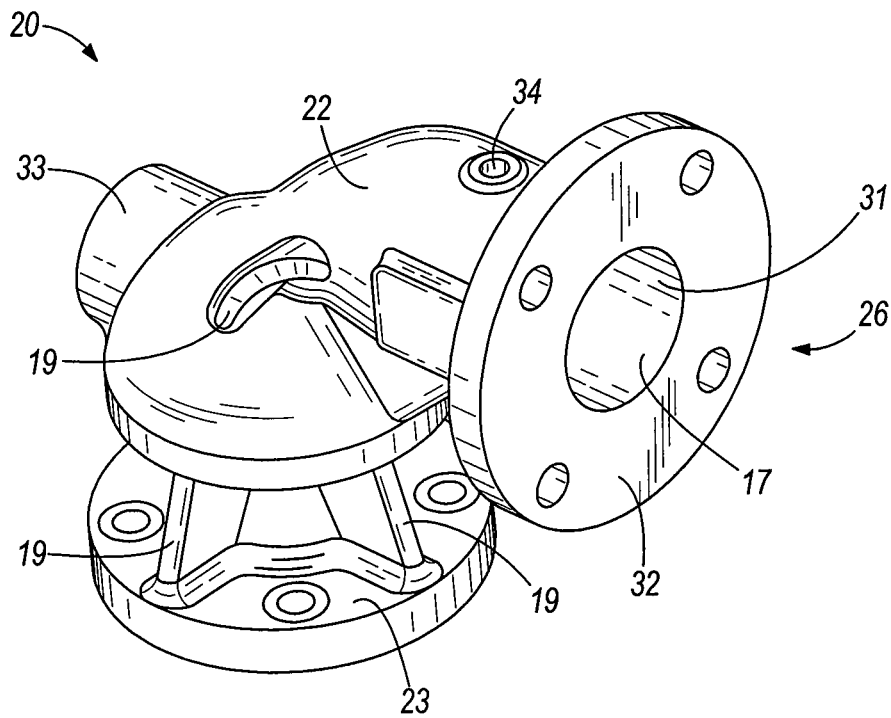
FIG. 5 is an isometric view of a pulsation dampener that is a first embodiment of the present invention.
Figure 6:
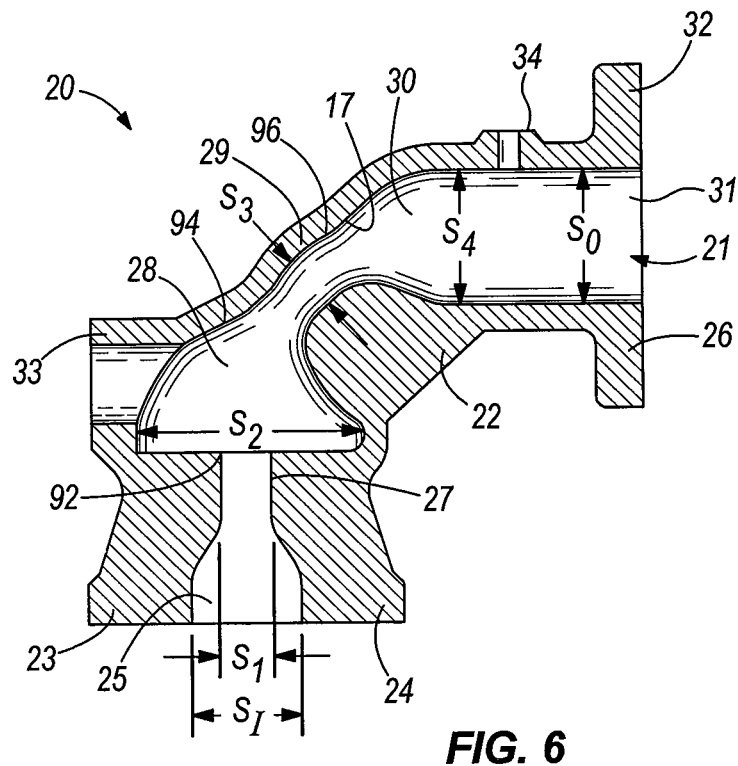
FIG. 6 is a cross-sectional view of the pulsation dampener of FIG. 5.
Figure 7:
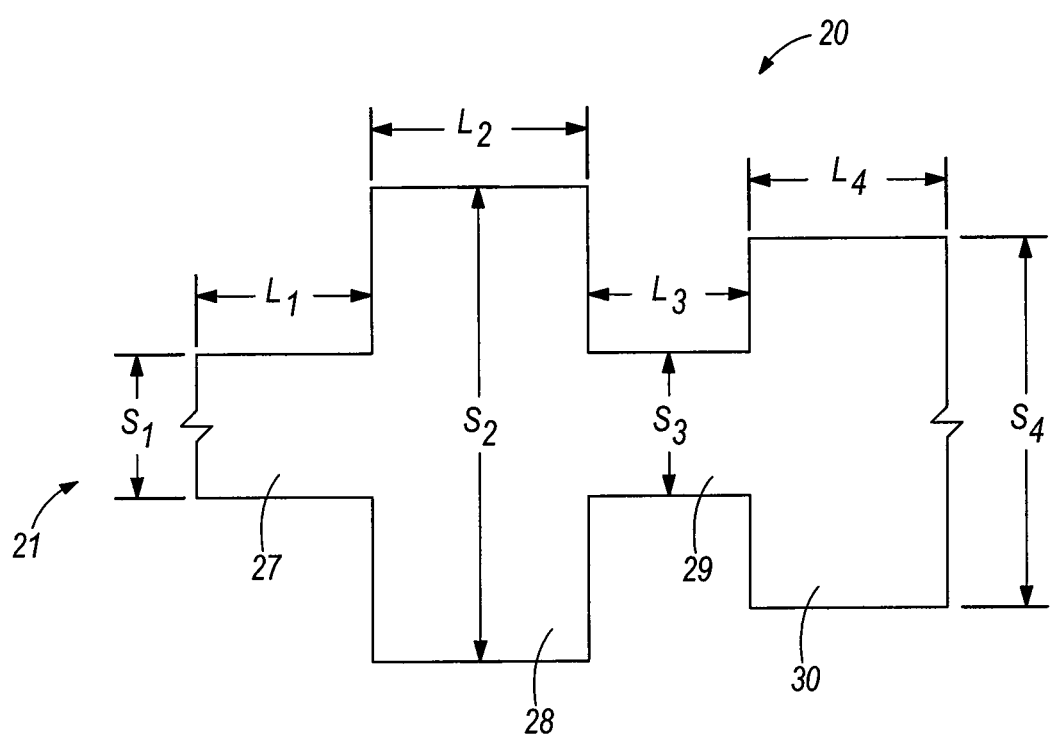
FIG. 7 is a schematic illustration of the pulsation dampener of FIG. 5.

Referring to FIGS. 5-7, a pulsation dampener 20 that is a first embodiment of the present invention will be described. The pulsation dampener 20 includes a body 22 having an inlet end 24 and an outlet end 26, and an inner surface 17. The inner surface 17 of the body 22 defines a fluid path 21 that extends between the inlet end 24 and the outlet end 26. In some embodiments, as shown in FIGS. 5 and 6, the dampener body 22 has an approximately 90-degree angle configuration such that the inlet end 24 is substantially perpendicular to the outlet end 26, and the fluid flow through the fluid path 21 changes direction by about 90 degrees. However, the body may have other configurations. For example, in some embodiments, the body 22 includes a 45-degree configuration, or a straight configuration. In a straight configuration, the inlet end 24 is substantially parallel to the outlet end 26, and the fluid flow through the fluid path 21 does not change directions.

In some embodiments, such as the embodiment illustrated in FIGS. 5 and 6, the body 22 includes a one or more ribs 19 positioned to enhance structural integrity of the body 22 and pulsation dampener 20. For example, the ribs 19 can be positioned on the outside of the body 22 adjacent narrow regions of the fluid path 21 (e.g., contracting chambers, as described below), as shown in FIG. 5, to enhance the structural integrity of the body 22 in those narrow regions.

In some embodiments, the dampener body 22 is a cast structure and may be provided with a port 33 in fluid communication with the fluid path 21, positioned to assist in clean out of the body 22, and particularly, in removal of media used in the casting process. The port 33 can be plugged after manufacture.

In some embodiments of the present invention, the pulsation dampener 20 is a first stage dampener and has a flange 23 at the inlet end 24 and a flange 32 at the outlet end 26 for connection to the intended piping system.

The inlet end 24 has an inlet 25 having an inlet cross-sectional area $S_I$. A fluid medium containing pressure pulsations, for example, compressed air from an oil free compressor airend, is directed into fluid path 21 of the pulsation dampener 20 through the inlet 25. The fluid medium is thereafter contracted as it travels through a first contracting chamber 27 having a cross-sectional area $S_1$ (e.g., the minimum cross-sectional area within the first contracting chamber 27) that is less than the inlet cross-sectional area $S_I$. From the first contracting chamber 27, the fluid medium travels into a first expansion chamber 28 having a cross-sectional area $S_2$ (e.g., the maximum cross-sectional area within the first expansion chamber 28) that is greater than the cross-sectional area $S_1$ of the first contracting chamber 27. The fluid medium is again contracted as it flows to a second contracting chamber 29 having a cross-sectional area $S_3$ (e.g., the minimum cross-sectional area within the second contracting chamber 29) that is less than the cross-sectional area $S_2$ of the first expansion chamber 28. Thereafter, the fluid medium flows into a second expansion chamber 30 having a cross-sectional area $S_4$ (e.g., the maximum cross-sectional area of the second expansion chamber 30) that is greater than the cross-sectional area $S_3$ of the second contracting chamber 29. From the second expansion chamber 30, the fluid medium exits the dampener 20 via the dampener outlet 31 to a downstream piping system (not shown). The outlet 31 has an outlet cross-sectional area $S_O$. In some embodiments, such as the embodiment illustrated in FIGS. 5-7, the outlet cross-sectional area $S_O$ is approximately equal to the cross-sectional area $S_4$ of the second expansion chamber 30.

Referring to FIG. 7, the inside cross-sectional areas $S_1$, $S_2$, $S_3$, and $S_4$ and the lengths $L_1$, $L_2$, $L_3$ and $L_4$ of the first contracting chamber 27, the first expansion chamber 28, the second contracting chamber 29, and the second expansion chamber 30, respectively, are chosen to provide the desired dampening of the fluid medium. Dampening can be measured in terms of transmission loss. The transmission matrix is the acoustical power difference between the incident and transmittal waves assuming an anechoic termination (i.e., without echo), which will be described in greater detail below.

By determining the geometrical values that maximize transmission loss at the desired ranges of frequencies, attenuation of those frequencies can be achieved. However, in order not to diminish the mechanical effectiveness of a compressor, the pulsation dampener 20 should not incur too great of a pressure drop across the pulsation dampener 20 to achieve the desired transmission loss. Balancing the transmission loss with the pressure drop allows for attenuation of desired frequencies without diminishing fluid output from the pulsation dampener 20.

The transmission matrix mathematical expression is as follows:

$$T = \begin{bmatrix} T_{11} & T_{12} \\ T_{21} & T_{22} \end{bmatrix}$$

This matrix is multiplied for each pipe junction. In the present pulsation dampener 20, there are three junctions with three resultant transmission matrices. The product of these three matrices yields a single matrix denoted as T'.

$$T' = \begin{bmatrix} T_{11} & T_{12} \\ T_{21} & T_{22} \end{bmatrix}\begin{bmatrix} T_{11} & T_{12} \\ T_{21} & T_{22} \end{bmatrix}\begin{bmatrix} T_{11} & T_{12} \\ T_{21} & T_{22} \end{bmatrix}$$

The equation used to describe each matrix follows:

$$T = e^{-jmk_c l}\begin{bmatrix} \cos k_c l & jY_o \sin k_c l \\ \dfrac{j}{Y}\sin k_c l & \cos k_c l \end{bmatrix}$$

wherein $j=\sqrt{-1}$; m=mach number; $k_c=\omega/c(1-m^2)$; $\omega$=angular frequency; c=speed of sound; $Y_i=c/S_i$; $S_i=i^{th}$ pipe cross-sectional area; and l=length of pipe.

The transmission loss denoted TL is the acoustical power loss between the incident and transmitted waves of an anechoically terminated silencer, or pulsation dampener. In terms of the transmission matrix T', the transmission loss is calculated as follows:

$$TL = 20\log_{10}\left[\dfrac{T'_{11} + \dfrac{S_2}{c}\cdot T'_{12} + \dfrac{c}{S_1}\cdot T'_{21} + T'_{22}}{2}\right]$$

where $S_I$ is the area at the inlet to the pulsation dampener 20 and $S_O$ is the terminating area of the pulsation dampener (i.e., the cross-sectional area of the outlet 31, as described above).

The sudden increase in cross-sectional area (e.g., in an expansion chamber) and sudden reduction in cross-sectional area (e.g., in a contracting chamber) is the primary mechanism for the power loss. In a simpler form, the TL (transmission loss) for each junction within the pulsation dampener can be determined from:

$$TL=10\log_{10}(S_{i+1}+S_i)^2/(4S_{i+1}S_i)$$

wherein $S_{i+1}$ and $S_i$ represent the pipe cross-sectional area changes at each junction, as in FIG. 7. By way of example only, the cross-sectional areas of various portions of the fluid path 21 can be represented by circles, and the cross-sectional areas can therefore be calculated from the respective diameters of such circles. For example, in a simple form, the first junction from contracting chamber 27 to expansion chamber 28 can be described by the following incoming and outgoing cross-sectional areas:

$$S_1=\pi D_1^2/4, \text{ and}$$

$$S_2=\pi d_1^2/4.$$

Furthermore, the second junction from expansion chamber 28 to contracting chamber 29 can be described by the following incoming and outgoing cross-sectional areas:

$$S_2=\pi d_1^2/4, \text{ and}$$

$$S_3=\pi D_2^2/4.$$

Finally, the third junction from contracting chamber 29 to expansion chamber 30 can be described by the following incoming and outgoing cross-sectional areas:

$$S_3=\pi D_2^2/4$$

$$S_4=\pi D_2^2/4$$

The frequency where the dampener 20 shows the greatest effectiveness is determined by the ¼ wavelength modes or $L_1/4=c/f$ or $L_1=4c/f$. To tune the effectiveness of the pulsation dampener 20 to specific frequencies, the neck length is chosen to be $L_1=4c/f$, wherein f is the frequency to be attenuated. The expansion area that follows would then be described as $$TL=10\log_{10}(S_{i+1}+S_i)/(4S_{i+1}S_i).$$

Thus, the neck lengths $L_1$, $L_2$, $L_3$ and $L_4$ determine the frequency at which the transmission loss is greatest, and the cross-sectional areas $S_i$ and $S_{i+1}$ determine the amplitude of that transmission loss. A more exact calculation can be made using the transmission matrix. Given the complexity of the pulsation dampener 20, a numerical method is preferably used to obtain the precise sizing.

Figure 8:
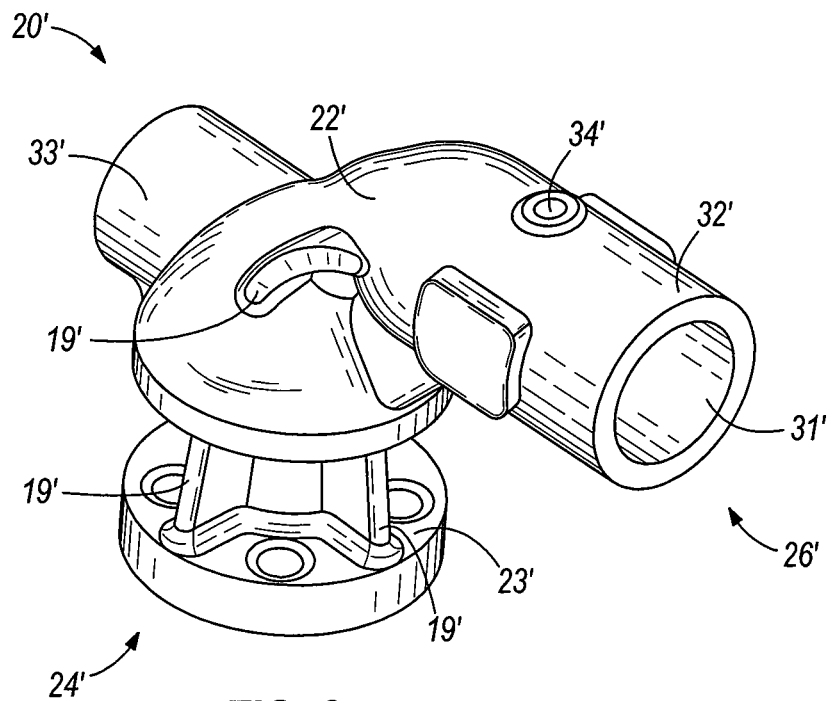
FIG. 8 is an isometric view of a pulsation dampener that is a second embodiment of the present invention.
Figure 9:
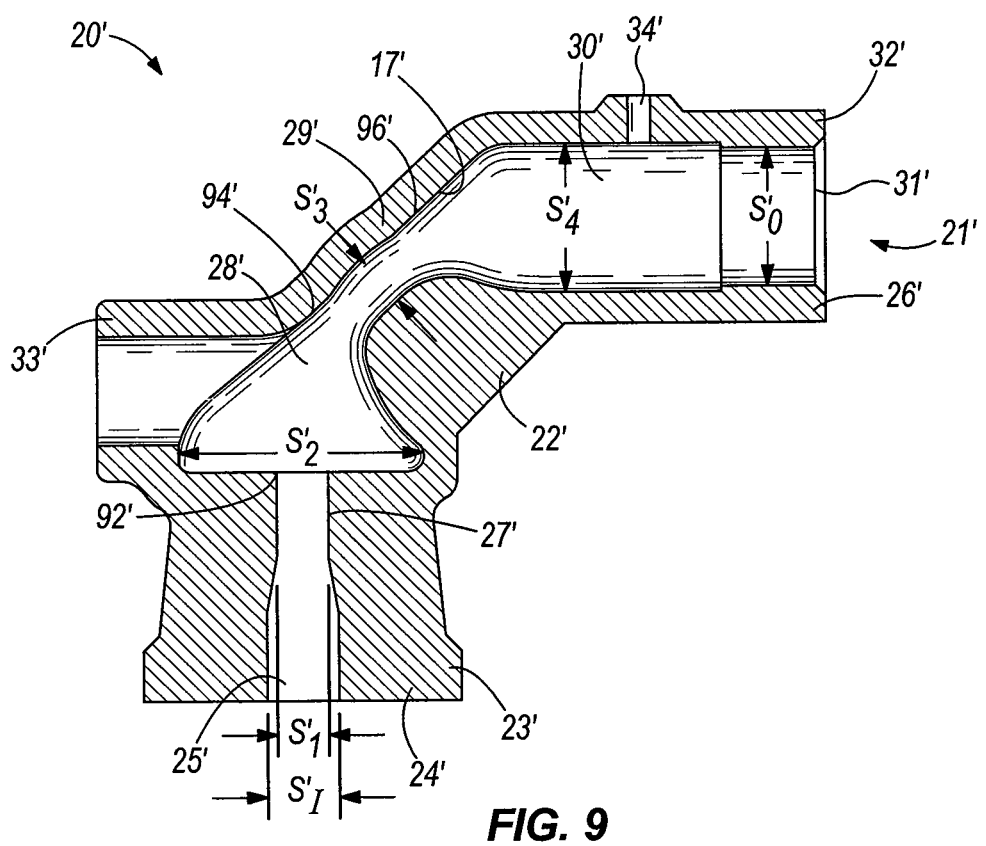
FIG. 9 is a cross-sectional view of the pulsation dampener of FIG. 8.

FIGS. 8 and 9 illustrate another pulsation dampener 20' according to the present invention, wherein like numerals represent like elements. The pulsation dampener 20' shares many of the same elements and features described above with reference to the illustrated embodiment of FIGS. 5-7. Accordingly, elements and features corresponding to elements and features in the illustrated embodiment of FIGS. 8 and 9 are provided with the same reference numerals followed by a prime sign (e.g., 20', 21', 22', etc.). Reference is made to the description accompanying FIGS. 5-7 for a more complete description of the features and elements (and alternatives to such features and elements) of the embodiment illustrated in FIGS. 8 and 9.

As can be seen in FIGS. 8 and 9, the dampener 20' can have various configurations to facilitate connection in various piping systems. For example, as illustrated, the dampener 20' may be a second stage dampener with a dampener body 22' having a straight outlet end 26' with a straight fitting 32'. Other configurations are also contemplated.

By configuring the pulsation dampener 20, 20' appropriately, the dampener 20, 20' mismatches acoustical impedances by contracting then expanding the fluid. The expansion volumes act as resonators, or resonating volumes, for attenuating high frequencies. By employing more than one expansion volume in the fluid path 21, 21', a desired acoustical performance is achieved (e.g., a desired attenuation level over a desired frequency range) without requiring that the cross-sectional area of the inlet 25, 25' be significantly smaller than pipes that feed the inlet 25, 25' (e.g., an outlet from a compressor or pipes in fluid communication with an outlet of a compressor). In addition, because impinging the fluid medium on solid surfaces would increase the pressure drop in the fluid medium, the pulsation dampener 20, 20' employs a smooth, contoured inner surface 17, 17' of the body 22, 22' to inhibit impinging of the fluid medium on solid surfaces. Such contouring of the inner surface 17, 17', in combination with the shape of the fluid path 21, allows for the above-mentioned acoustical performance while substantially reducing the pressure drop in the fluid medium as it passes through the pulsation dampener 20, 20'.

In some embodiments, the pulsation dampeners 20 and 20' of the present invention attenuate frequencies in the range of less than about 5000 Hz. In other words, the transmission loss achieved by the pulsation dampeners 20 and 20' is sufficiently large in this frequency range. In some embodiments, the pulsation dampeners 20 and 20' attenuate frequencies in the range of about 500 Hz to about 5000 Hz. In some embodiments, the pulsation dampeners 20 and 20' attenuate frequencies in the range of about 800 Hz to about 5000 Hz. In some embodiments, the pulsation dampeners 20 and 20' of the present invention provide at least about 20 dB of attenuation in pressure pulsations in having a frequency ranging from about 500 Hz to about 5000 Hz. In some embodiments, the pulsation dampeners 20 and 20' provide between about 20 dB and 40 dB of attenuation in pressure pulsations having a frequency ranging from about 500 Hz to about 5000 Hz. Of course, it should be understood that the geometry of the pulsation dampeners 20 and 20' of the present invention can be precisely controlled to achieve the desired transmission loss and attenuation across a desired range of frequencies, as described above.

Figure 10:
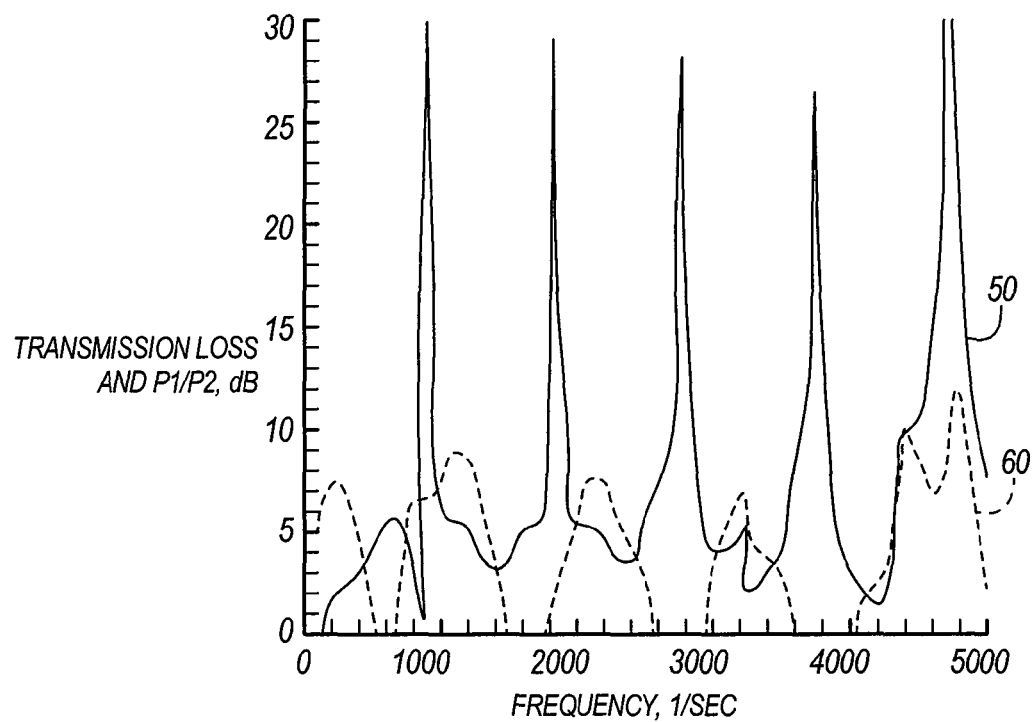
FIG. 10 is a graph of transmission loss and pressure drop versus frequency for the first stage venturi of FIGS. 1 and 2.
Figure 11:
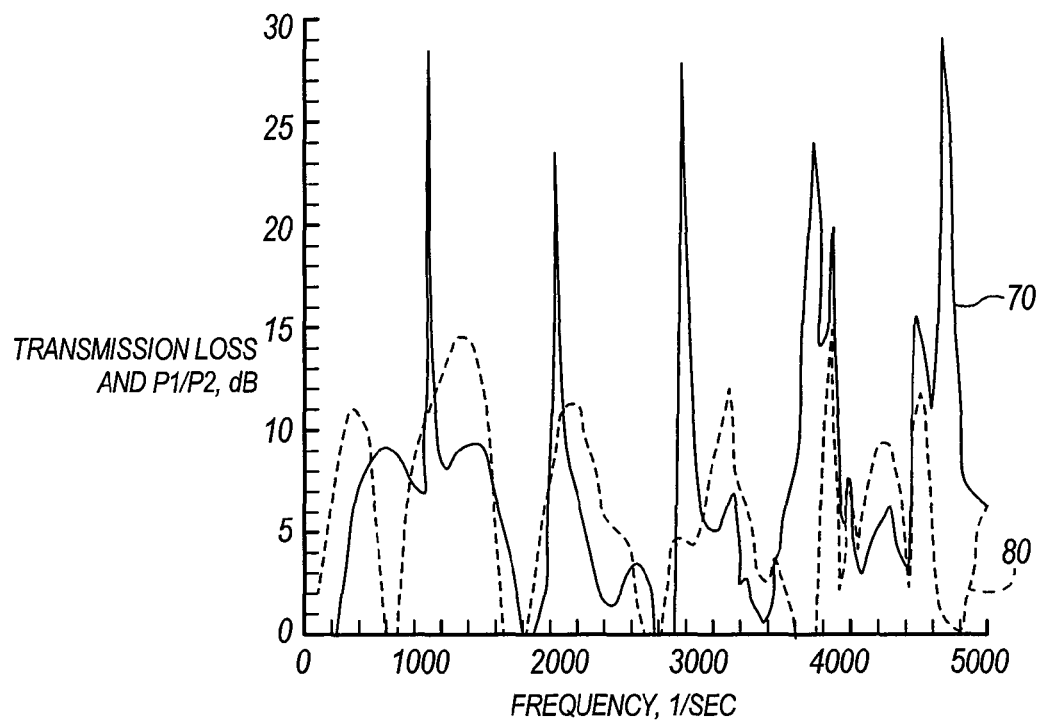
FIG. 11 is a graph of transmission loss and pressure drop versus frequency for the second stage venturi of FIGS. 3 and 4.

Typically, performance of a silencer, or a pulsation dampener, is based at least partially on two indicators: noise reduction index (NR) and transmission loss index (TL). NR can be described as the difference between the sound pressure levels measured at the inlet (e.g., the inlet 25 of the pulsation dampener 20) and the outlet (e.g., the outlet 31 of the pulsation dampener 20) of a dampener. That is, $$NR = l_{P1} - l_{P2} = 20\log_{10}\frac{P1}{P2}$$

wherein $l_{P1}$ is the sound pressure level at the inlet of a dampener, and $l_{P2}$ is the sound pressure level at the outlet of a dampener. When a sound pressure wave impinges on the inlet of a dampener, some of the sound pressure energy is transmitted through the dampener, while some of it is reflected back. NR does not account for the reflected portion of the sound pressure energy. As mentioned above, TL is the change in the acoustical sound power between the incident and the transmitted waves of an anechoicially terminated dampener. TL accounts for the difference between the sound power transmitted to the dampener and the sound power that exits the dampener. FIGS. 10 and 11 show a comparison of the P1/P2 (i.e., the ratio of the sound pressure at the inlet to the sound pressure at the outlet, which is related to NR) and TL prediction for prior art venturis 10 and 15. Because TL is a widely accepted indicator of a dampener's performance, TL is used to compare the performance of the prior art venturis 10 and 15 with the pulsation dampeners 20 and 20' of the present invention, as illustrated in FIGS. 10-13 and described below.

Figure 1:
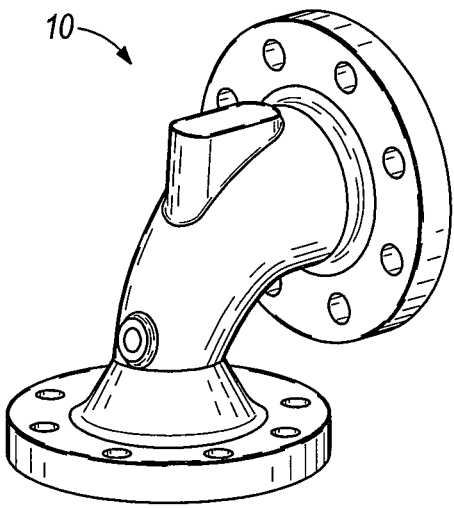
FIG. 1 is an isometric view of a prior art first stage venturi.
Figure 2:
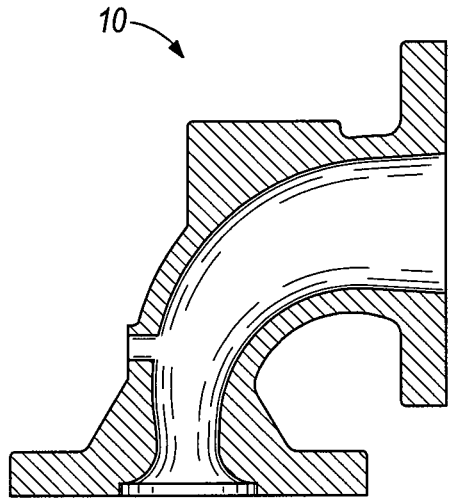
FIG. 2 is a cross-sectional view of the prior art first stage venturi of FIG. 1.

FIG. 10 illustrates a transmission loss curve 50 and a pressure drop curve 60 through the prior art venturi 10 illustrated in FIGS. 1 and 2 for frequencies ranging from 0 to 5000 Hz. As shown in FIG. 10, the transmission loss 50 through the venturi 10 varies greatly depending on frequency, and exhibits many "dips" of greatly reduced transmission loss at various frequencies. For example, a first "dip" in transmission loss through the venturi 10 occurs at about 900 Hz. As a result, the venturi 10 would be a poor pulsation dampener for airflow having a frequency of about 900 Hz. Furthermore, because of the many "dips" in the transmission loss curve 50 throughout the frequency range illustrated (i.e., 0 to 5000 Hz), the venturi 10 is not an effective or useful means to dampen pulsations across this frequency range. The venturi 10 may effectively attenuate pulsations for very narrow frequency ranges (e.g., from about 975 Hz to about 1000 Hz), but would not function robustly as a pulsation dampener according to the present invention.

Figure 3:
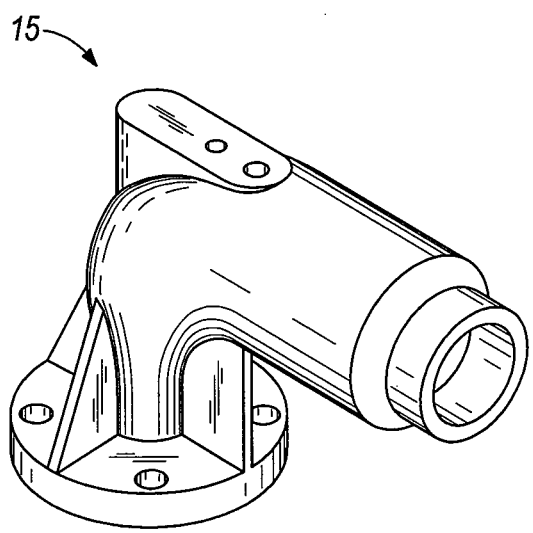
FIG. 3 is an isometric view of a prior art second stage venturi.
Figure 4:
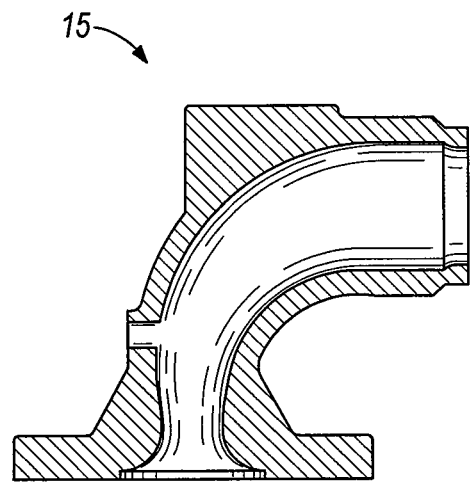
FIG. 4 is a cross-sectional view of the prior art second stage venturi of FIG. 3.

FIG. 11 illustrates a transmission loss curve 70 and a pressure drop curve 80 through the prior art venturi 15 illustrated in FIGS. 3 and 4 for frequencies ranging from 0 to 5000 Hz. Similar to the transmission curve 50 describe above with respect to FIG. 10, the transmission loss 70 through the venturi 15 varies greatly depending on frequency, and exhibits many "holes" and "dips" of zero or greatly reduced transmission loss, respectively, at various frequencies. For example, a first "hole" in transmission loss occurs at about 1700 Hz for the venturi 15, and a "dip" occurs at about 2250 Hz. Similar to the venturi 10 illustrated in FIGS. 1 and 2, the venturi 15 illustrated in FIGS. 3 and 4 is not an effective pulsation dampener at frequencies ranging from 0 to 5000 Hz. The venturi 15 may only effectively attenuate pulsations occurring at very narrow ranges of frequencies (e.g., from about 975 to about 1000 Hz).

Figure 12:
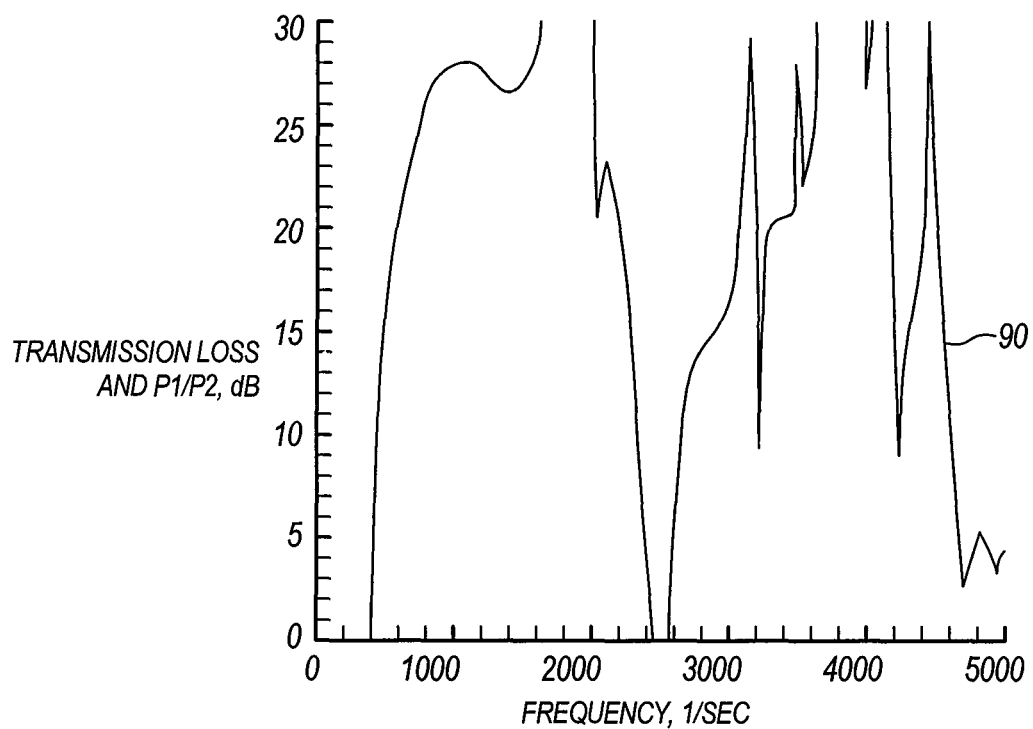
FIG. 12 is a graph of transmission loss versus frequency for the pulsation dampener of FIGS. 5-7.

FIG. 12 illustrates a transmission loss curve 90 for the pulsation dampener 20 illustrated in FIGS. 5-7 for frequencies ranging from 0 to 5000 Hz. As shown in FIG. 12, the transmission loss 90 achieved by the pulsation dampener 20 occurs over a large range of frequencies. For example, the transmission loss curve experiences a "hole" around about 2500 Hz, a first "dip" around about 3250 Hz, and a second "dip" around about 4250 Hz. Other than these "holes" and "dips," the transmission loss is at least about 10 over frequencies ranging from about 500 to about 2300 Hz, from about 2800 to about 3200 Hz, from about 3300 to about 4200 Hz, and from about 4300 to about 4600 Hz. As a result, much greater ranges of frequencies are attenuated using the pulsation dampener 20 than the prior art venturis 10 and 15. The lengths (e.g., $L_1$, $L_2$, $L_3$ and $L_4$) of the various sections of the pulsation dampener 20 can be varied to position any "holes" or "dips" in transmission loss at frequencies that are least important or relevant to a specific application using the relationship between neck length and frequency given above.

Furthermore, the pulsation dampener 20 also achieved a lower pressure drop than that incurred with the prior art venturis 10 and 15. Fluid medium is allowed to communicate between the outlet of a compressor (not shown) that is coupled to the inlet end 24 of the body 22, and in fluid communication with the inlet 25. As shown in FIGS. 5 and 6, fluid medium is further allowed to flow through the fluid path 21 defined by the body 22 of the pulsation dampener 20 to the outlet 31 without impinging on any solid surfaces, because the inner surface 17 is defined by rounded or contoured surfaces. For example, a first junction 92 is defined between the first contracting chamber 27 and the first expansion chamber 28, a second junction 94 is defined between the first expansion chamber 28 and the second contracting chamber 29, and a third junction 96 is defined between the second contracting chamber 29 and the second expansion chamber 30. The inner surface 17 at, or adjacent, each of the junctions 92, 94 and 96 is substantially smooth and contoured to inhibit impinging the fluid medium on any solid surfaces as it flows through the fluid path 21, which reduces the pressure drop across each junction 92, 94 of 96, and across the entire dampener 20.

Figure 13:
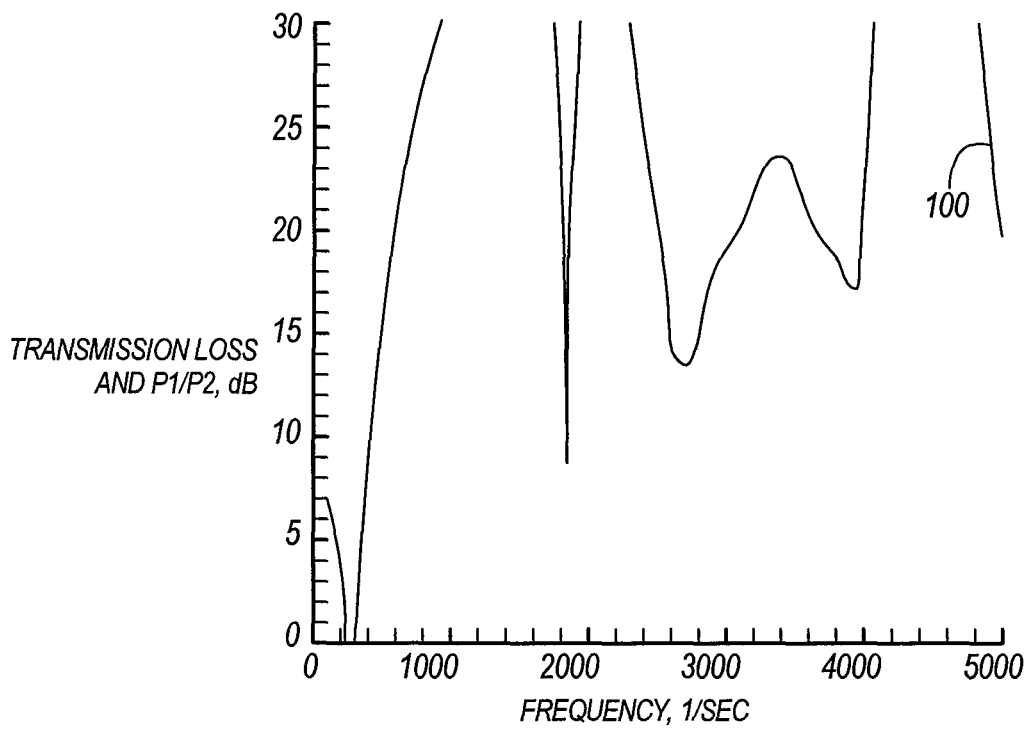
FIG. 13 is a graph of transmission loss versus frequency for the pulsation dampener of FIGS. 8-9.

FIG. 13 illustrates a transmission loss curve 100 for the pulsation dampener 20' illustrated in FIGS. 8-9 for frequencies ranging from 0 to 5000 Hz. As shown in FIG. 13, the transmission loss 100 achieved by the pulsation dampener 20' occurs over a large range of frequencies. For example, the transmission loss curve experiences a "dip" around about 1825 Hz. Other than this "dip," the transmission loss is at least about 10 dB over frequencies ranging from about 400 Hz to about 1820 Hz, and from about 1840 Hz to about 5000 Hz. As a result, much greater ranges of frequencies are attenuated using the pulsation dampener 20' than the prior art venturis 10 and 15. The specific geometry of the pulsation dampener 20' can be controlled using the equations and relationships described above to position any "holes" or "dips" in transmission loss at frequencies that are least important or relevant to a specific application. Furthermore, the pulsation dampener 20' also achieved a lower pressure drop than that incurred with the prior art venturis 10 and 15, due, at least in part, to the inner surface 17' being rounded and contoured appropriately.

One factor that can make pulsation dampeners for air compressors a complex problem to model is the presence of unsteady fluid flow that begins at compressor discharge port, to which the pulsation dampener is fluidly coupled.

One particularly effective location for a pulsation dampener, e.g., used with an oil-free screw compressor, is adjacent to the airend (or fluid end) discharge port, where the pressure pulsation is often greatest. The pressure pulsation in the fluid can be described as slugs of fluid (e.g., air) that are discharged from the compressor each time rotors in the compressor open and close. Such fluid flow, including the pulsations, is fluid dynamic by nature, and these pressure pulsations travel at the convective speed of the fluid in the form of flow structures that can be described as vortices.

Pressure pulsations in the fluid can be measured at the discharge port of the compressor. Typically, these pressure pulsations include a mean pressure component, and a fluctuating pressure component. For example, for a 100-psig compressor, the mean pressure component can be about 100 psig, and the fluctuating pressure component can vary by ±30 psi. The primary frequency for the fluctuating pressure component is approximately the frequency at which the discharge port of the compressor opens and closes. In some embodiments, this frequency is greater than about 500 Hz. Higher frequencies can also be present in the fluid stream, because the vortices (or similar flow structures) can divide into smaller vortices, and produce harmonic components. In some embodiments, the amplitude of the fluctuating pressure component of the pressure pulsation for the 100-psig compressor can be from about 70 psig to about 130 psig.

One purpose of the pulsation dampeners 20 and 20' of the present invention is to convert the fluid dynamic pulsations described above into acoustic pulsations by effectively squeezing the discharge vortices. The fluid pulsation that is discharged from the compressor, that enters the pulsation dampener 20 or 20', can be decomposed into two components: an acoustic component that has a wavelength, $\lambda_a$, that travels at the speed of sound, c, and a fluid dynamic component that has a wavelength, $\lambda_g$, that travels at the convective velocity of the gas, $u_g$. In some compressor applications, the Mach number is less than 0.2, which requires the acoustic wavelength to be greater than the fluid dynamic instability wavelength (i.e., $\lambda_a > \lambda_g$) for a given frequency. As the fluid progresses further into the pulsation dampener 20 or 20', the pressure pulsations transition from organized vortical structures to small-scale turbulent structures. As this transition occurs, the pulsations can become mostly acoustic rather than fluid dynamic. The pulsation dampeners 20 and 20' of the present invention accomplish this transition both as a fluid dynamic device and as an acoustic device.

The pulsation dampeners 20 and 20' of the present invention can provide several results. First, the pulsation dampeners 20 and 20' can rapidly convert the fluid dynamic pressure pulsations discharged from the airend of a compressor to an acoustic pressure pulsation. Second, the pulsation dampeners 20 and 20' can reduce the acoustic pressure pulsations by using contraction and expansion chambers (such as those described above and illustrated in FIGS. 5-9). Third, the pulsation dampeners 20 and 20' can reduce the pressure pulsations in the fluid stream by using a contoured fluid path 21 or 21' (as defined by the inner surface 17 or 17' of the pulsation dampener 20 or 20') that minimizes the amount of mean pressure loss (i.e., the fluid dynamic component of the pressure pulsations). The pulsation dampeners 20 and 20' of the present invention can be designed to accomplish the desired attenuation of pulsations using acoustic and computational fluid dynamic computer software to make the numerical predictions.

What is claimed is:

1. A method of attenuating fluid dynamic pulsations that propagate through a flow of fluid at a convective velocity of the fluid, the pulsations having an organized vortical structure, the method comprising:
   directing the flow to a pulsation dampener inlet having a first area;
   transitioning the organized vortical structure to a small-scale turbulent structure by squeezing the vorticies by passing the flow of fluid through a passage having a second area that is smaller than the first area, then instantaneously expanding the flow of fluid by passing it into a chamber having a third area measured at an inlet of the chamber that is larger than the second area, the third area being the largest area within the chamber; and
   discharging the flow of fluid from the chamber via a contracting flow path, the flow of fluid including attenuated fluid dynamic pulsations and acoustic pulsations that travel through the flow of fluid at the speed of sound.

2. The method of claim 1, further comprising attenuating the acoustic pulsations by directing the flow of fluid from the chamber through a converging diverging nozzle.

3. The method of claim 1, wherein the flow of fluid enters the pulsation dampener inlet in a series of slugs having a frequency that is proportional to a rotational speed of a compressor.

4. A method of attenuating pulsations produced by the operation of a compressor, operation of the compressor producing fluid dynamic pulsations that propagate through a flow of fluid at a convective velocity of the fluid and acoustic pulsations that propagate through the flow of fluid at the speed of sound, the method comprising:
   converting the fluid dynamic pulsations to acoustic pulsations by first constricting the flow of fluid and then instantaneously expanding the flow of fluid; and
   attenuating the acoustic pulsations by passing the flow of fluid through a converging diverging nozzle, wherein a converging portion of the converging nozzle begins immediately after the instantaneous expansion of the flow of fluid.

5. The method of claim 4, wherein the converting step includes directing the flow of fluid through a converging nozzle.

6. The method of claim 5, wherein the converting step includes directing the flow of fluid from the converging nozzle to an expansion chamber.

7. The method of claim 6, wherein the converging nozzle includes a minimum cross sectional area at an outlet and the expansion chamber includes a maximum cross sectional area at an inlet, the inlet immediately adjacent the outlet.

8. The method of claim 4, wherein the attenuating step includes directing the flow of fluid through a converging nozzle.

9. The method of claim 8, wherein the attenuating step includes directing the flow of fluid through a diverging nozzle following passage through the converging nozzle.

10. The method of claim 9, wherein the converging nozzle and the diverging nozzle are positioned adjacent one another such that the rate of change of the cross sectional areas along the flow path is continuous.

11. The method of claim 4, wherein the instantaneously expanding step includes passing the flow of fluid through a junction having a first diameter on a first side of the junction and a second diameter on the second side of the junction, the second diameter being substantially larger than the first diameter.

12. The method of claim 11, wherein the second diameter is at least about four times the first diameter.

13. A method of attenuating pulsations in a flow of fluid produced by the operation of a compressor, the method comprising:

directing the flow of fluid to a pulsation dampener inlet having a maximum diameter that defines a first cross sectional area;

constricting the flow of fluid by passing it through a constricting flow path having a minimum diameter that defines a second cross sectional area that is smaller than the first cross sectional area;

suddenly expanding the flow of fluid by discharging the flow of fluid into a chamber having an inlet cross sectional area that is substantially larger than the second cross sectional area, the inlet cross sectional area being measured immediately adjacent the minimum diameter of the constricting flow path;

gradually constricting the flow of fluid by passing it through a chamber flow path in which the cross sectional area gradually reduces from a maximum cross sectional area at the chamber inlet to a minimum third cross sectional area;

gradually expanding the flow of fluid by passing it through an expanding flow path in which the cross sectional area gradually increases to a maximum fourth cross sectional area; and discharging the flow of fluid from the pulsation dampener via an opening having an outlet cross sectional area that is about equal to the fourth cross sectional area.

\* \* \* \* \*